Nov. 15, 1938.  S. M. NAMPA  2,136,751
GEAR SHIFTING MECHANISM FOR MOTOR VEHICLES
Filed Dec. 16, 1936  2 Sheets-Sheet 1
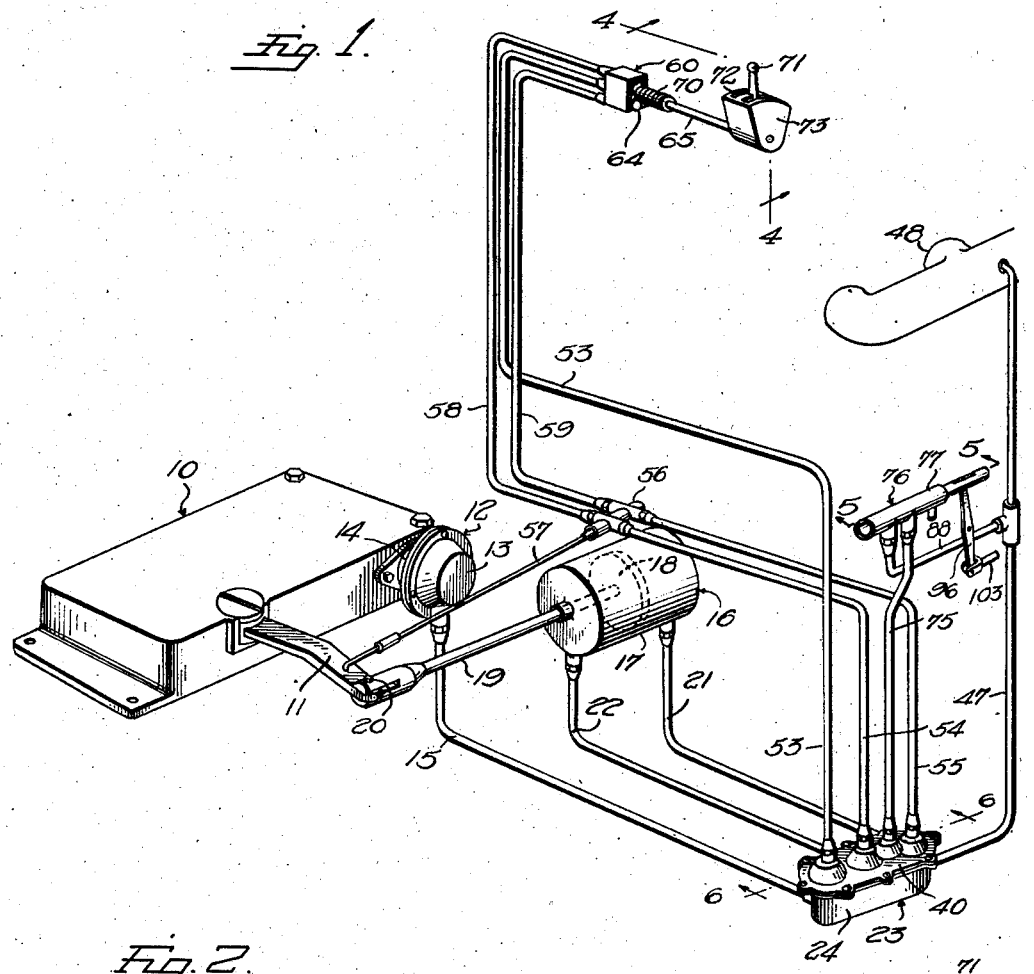
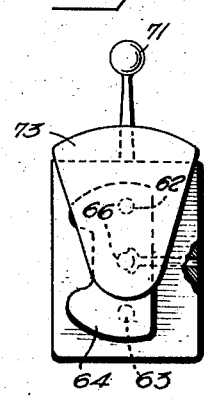
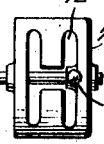
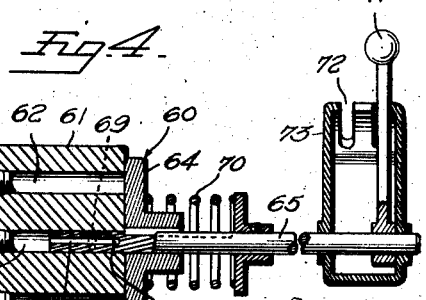
Inventor
SULO M. NAMPA

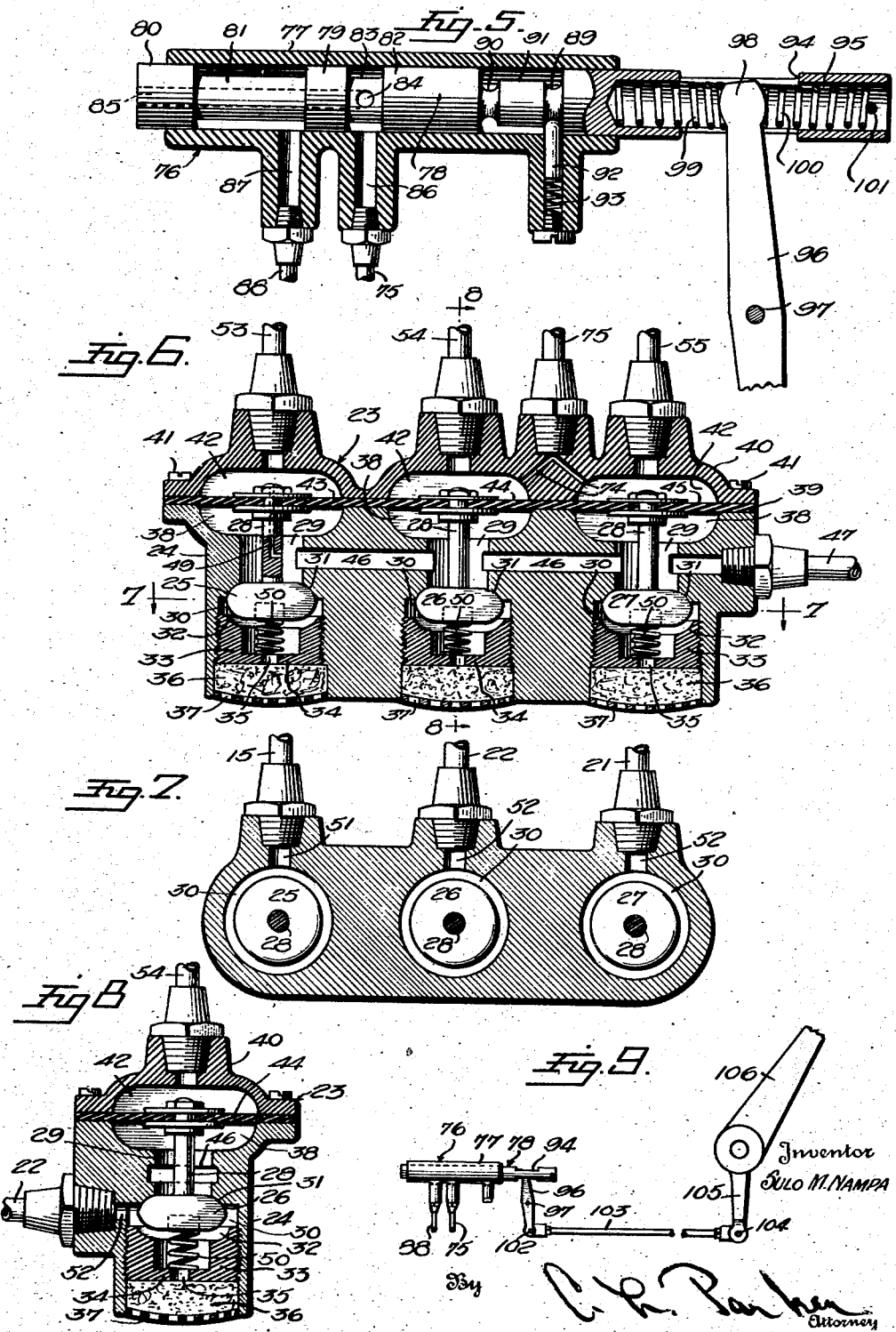

Patented Nov. 15, 1938

2,136,751

UNITED STATES PATENT OFFICE 2,136,751

GEAR SHIFTING MECHANISM FOR MOTOR VEHICLES

Sulo Michael Nampa, Detroit, Mich., assignor to Automatic Shifters, Inc., Richmond, Va., a corporation of Virginia Application December 16, 1936, Serial No. 116,195

20 Claims. (Cl. 74—334)

This invention relates to gear shifting mechanisms for motor vehicles.

In the prior patent of Edward G. Hill and Henry W. Hey, No. 2,030,838, there is disclosed a novel type of gear shifting mechanism for motor vehicle transmissions wherein the differential pressure for effecting the shifting operations is provided by utilizing the vacuum of the intake manifold. Such mechanism is highly efficient and rapid in operation for several reasons. For example, the operation of the main valve mechanism which controls the shifting motor is of such character as to assist in providing a relatively rapid shifting operation.

Moreover, the patent referred to includes an auxiliary valve mechanism which, among other things, functions in conjunction with other parts of the mechanism, to connect both ends of the shifting motor to the source of vacuum, thus "vacuum suspending" the piston in each of its gear positions. The subsequent admission of air to the end of the shifting motor cylinder adjacent which the piston is arranged results in extremely rapid movement of the piston of the motor.

In the structure of the patent, the vacuum suspension of the piston in its respective gear positions is present only when the vehicle clutch is disengaged, and it was found desirable to maintain the vacuum suspension of the motor piston in its respective gear positions regardless of the position of the clutch elements, and at the same time, to prevent any shifting operation from taking place except upon disengagement of the clutch. Such features are present in the structure of the copending application of Edward G. Hill and Henry W. Hey, Serial No. 43,104, filed October 1st, 1935.

In the two prior structures referred to, the controlling of the main valves of the shifting motor is effected by controlling communication between two control pipes and the atmosphere, by means of a manual selector valve. The characteristics of such type of apparatus are such that the piston of the shifting motor is vacuum suspended when both of such control pipes are opened to the atmosphere. In the copending application referred to, a clutch operated valve is provided which functions to connect both of said control pipes and their associated fluid pressure chambers to the atmosphere when the clutch is in engagement, thus retaining the vacuum suspension of the piston of the shifting motor and rendering the manual selector valve mechanism ineffective for performing any shifting operations. When the clutch is disengaged, the two control pipes and their associated fluid pressure chambers are disconnected from the atmosphere at the clutch operated valve and are connected to the source of vacuum, whereupon the apparatus is subject to manual control.

Thus the apparatus of the copending application functions to provide two results, namely, the maintenance of the vacuum suspension of the piston of the shifting motor in its respective gear positions regardless of the position of the clutch, and the prevention of a shifting operation until after the clutch is disengaged. In the structure of the copending application, however, the clutch operated valve referred to is connected for direct actuation by the clutch, and accordingly operates between its two positions at a rate of movement corresponding to the rate at which the clutch pedal is depressed.

An important object of the present invention is to provide a gear shifting mechanism of the type disclosed in the patent and copending application referred to having a clutch operated valve which performs the functions of the corresponding valve of the copending application, but which snaps rapidly from one position to its other position upon movement of the clutch pedal.

A further object is to provide a valve mechanism of this character wherein the clutch valve remains in either of its positions until substantial movement of the clutch pedal has taken place, and thereupon moves extremely rapidly to its other position to perform its intended function.

A further object is to provide a clutch operated valve in a gear shifting mechanism of this character wherein the actual movement of the valve is effected by the pressure of a spring, and wherein the spring pressure is built up by movement of the clutch pedal to snap the valve from one of its positions to the other position when the pressure of the spring which operates the valve is built up to a predetermined extent.

Other objects and advantages of the invention will become apparent during the course of the following description.

In the drawings I have shown one embodiment of the invention. In this showing—

Figure 1 is a perspective view of a portion of a motor vehicle gear set showing the shifting mechanism associated therewith, Figure 2 is an end elevation of the selector valve, parts being shown in section, Figure 3 is a plan view of the selector handle device, Figure 4 is a section on line 4—4 of Figure 1, Figure 5 is an enlarged longitudinal sectional view through the clutch operated valve, taken on line 5—5 of Figure 1, Figure 6 is a vertical longitudinal sectional view through the main valve mechanism, taken on line 6—6 of Figure 1, Figure 7 is a horizontal sectional view taken substantially on line 7—7 of Figure 6, Figure 8 is a transverse vertical section on line 8—8 of Figure 6, and, Figure 9 is a detail side elevation showing the clutch operated valve and one means of connecting such valve to the clutch pedal.

Referring to the drawings, the numeral 10 designates a motor vehicle transmission having the usual shift rails adapted to be actuated by a horizontal lever 11 having one end projecting from the transmission housing. Either of the shift rails may be selected for operation by properly controlling a crossover motor 12. The particular means for selecting the shift rails and transmitting movement thereto forms no part per se of the present invention and may be of any desired type as, for example, the type shown in the copending application of Edward D. Lasley, Serial No. 99,843, filed September 8, 1936.

The crossover motor 12, in accordance with the disclosure of the patent and copending application referred to, is provided with a pair of casing sections 13 and 14 having a diaphragm therebetween spring pressed to bias the second and high gear shift rail for operation. The casing 13 is provided with a pipe 15, leading to a valve mechanism to be described, which is adapted to connect the pipe 15 to the source of vacuum to operate the motor 12 and thus transfer the shift to the first and reverse gear shift rail.

The lever 11 is shifted by means of a main shifting motor indicated as a whole by the numeral 16. This motor comprises a cylinder 17 having a piston 18 therein, connected to one end of a piston rod 19. The free end of this piston rod is connected as at 20 to the outer end of the lever 11. The motor 16 may be supported in any suitable manner so as to permit slight movement thereof necessary to compensate for the swinging movement of the pivot pin 20 about the pivot axis of the lever 11.

The perspective view in Figure 1 looks toward the forward end of the motor vehicle, and the forward and rear ends of the cylinder 17 are provided with pipes 21 and 22 which, together with the pipe 15, lead to a main valve mechanism indicated as a whole by the numeral 23 and illustrated in detail in Figures 6, 7 and 8 of the drawings. Referring to Figure 6, it will be noted that the main valve mechanism comprises a preferably cast valve body 24 having three valves 25, 26 and 27 therein provided with vertical stems 28 extending upwardly through vertical passages 29. Each of the valves 25, 26 and 27 is arranged in a chamber 30 at the top of which is formed a valve seat 31 engageable by the upper face of the corresponding valve. The lower faces of the valves are movable downwardly into engagement with seats 32 formed in the upper ends of the plugs 33. Each of these plugs is provided with a lower internal flange 34 having an opening 35 therethrough for the admission of air. A body of filtering material 36 is arranged below each valve 33 and is held in position by a screen or perforated plate 37.

The upper face of the valve body is provided with a plurality of recesses 38, and these recesses are closed by an elastic sheet 39. A cap 40 is secured in position over the sheet 39 as at 41, the edge portions of the elastic sheet 39 thus being clamped between the cap 40 and the upper face of the valve body. The cap 40 is provided with chambers 42 corresponding in position to the respective chambers 38, the sheet 39 thus being divided into a plurality of diaphragms 43, 44 and 45 to which are connected the upper ends of the stems of the respective valves 25, 26 and 27.

It will be apparent that the chambers 38 communicate with the respective vertical openings 29, and these openings are connected by a longitudinal passage 46 extending into one end of the valve body. This passage communicates with a pipe 47 leading to the intake manifold 48 of the vehicle engine. Thus it will be apparent that vacuum is always present in the chambers 38 beneath the several diaphragms 43, 44 and 45.

The stem of the valve 25 is provided with a passage 49 communicating with the spaces on opposite sides of the diaphragm 43. The passage 49 is relatively small in cross-sectional area and obviously affords constant restricted communication between the corresponding diaphragm chamber 42 and the vacuum passage 46. The other two chambers 42, above the diaphragms 44 and 45, also have restricted communication with the source of vacuum in a manner to be referred to, and the presence of vacuum above either of the diaphragms 43, 44 or 45 creates a normal bias tending to move the corresponding valve 25, 26 or 27 upwardly into engagement with its seat 31. The valve mechanism shown in Figures 6, 7 and 8 forms the subject of the copending application of Edward D. Lasley, Serial No. 97,451, filed August 22, 1936, and the feature of normally biasing the valves 25, 26 and 27 upwardly is fully disclosed in such copending application. The valves are subject to rapid operation in view of the short distance each valve is required to travel, but if desired, a spring 50 may be arranged beneath each valve to increase its speed of movement from its lower position to its upper position.

As shown in Figure 7, the chamber 30 of the valve 25 communicates through a lateral port 51 with the pipe 15, leading to the crossover motor 12. The chambers 30 of the respective valves 26 and 27 communicate through ports 52 with the pipes 22 and 21, which lead to the opposite ends of the motor cylinder 17. It will be apparent that when the valve 25 is in its upper position the pipe 15 is in communication with the atmosphere, and when the valve 25 is in its lower position, the pipe 15 communicates with the vacuum passage 46. Similarly, the opposite ends of the motor cylinder 17 communicate with the atmosphere or the vacuum passage 46 according to the positions of the respective valves 26 and 27.

Three pipes 53, 54 and 55 are utilized for controlling the operation of the main valves, and these pipes communicate with the chambers 42 above the respective diaphragms 43, 44 and 45, as shown in Figure 6. The pipes 54 and 55 lead to an auxiliary valve device 56 having a valve (not shown) therein, connected by a link 57 to the lever 11. The valve device 56 conforms the functions of the valve shown in Figures 8, 9 and 10 of Patent No. 2,030,838, referred to above, and it may be of the type shown in Figures 5 and 6 of the copending application of Henry W. Hey, Serial No. 104,139, filed October 5, 1936. The function of the valve device 56 is to arrest the gear shifting movement in neutral position when desired, and to effect the vacuum suspension of the shifting motor piston 18 in either of its gear positions. The valve device 56 includes passages connected at one end to the pipes 54 and 55 and at their other ends to pipes 58 and 59. In accordance with the disclosure of copending application Serial No. 104,139, the pipes 58 and 59 are in constant communication with the respective pipes 54 and 55.

The pipes 53, 58 and 59 extend to a selector valve mechanism indicated as a whole by the numeral 60. This mechanism comprises a valve body 61 having passages 62 and 63 communicating with the respective pipes 58 and 59. The passages 62 and 63 open through the end of the valve body opposite the pipes 58 and 59 and are controlled by a valve 64 splined on a rock shaft 65. The valve body 61 is provided with a third passage 66 in which the inner end of the shaft 65 is slidable and the passage 66 communicates with the pipe 53. The shaft 65 is provided with an axial passage 67 communicating with a lateral port 68 formed in the shaft 65 and movable into communication with a port 69 formed in the valve body 61 when the shaft 65 is moved longitudinally toward the left of the position shown in Figure 4, in a manner to be described. As previously stated, the valve 64 is splined on the shaft 65 and a spring 70 maintains the valve 64 on its seat.

The shaft 65 is provided with a selector handle 71 operating in an H-slot 72 formed in a suitable housing 73. In accordance with the disclosure of Patent No. 2,030,838, the handle 71 is movable in the H-slot 72 to partake of the same movement as a conventional gear shift lever, the movement of the handle 71 to each of its positions providing a gear ratio corresponding to the similar position of the usual gear shift lever.

As previously stated, the vacuum chambers 42 above the diaphragms 44 and 45 (Figure 6) are adapted to have restricted communication with the source of vacuum. The principal feature of the present invention is the provision of a novel valve mechanism for controlling communication between the vacuum chambers referred to and the atmosphere and vacuum, depending on whether the vehicle clutch is in engagement. Referring to Figure 6, it will be noted that the cap 40 is provided with restricted passages 74 communicating with each other at their upper ends and diverging toward their lower ends to communicate with the chambers 42 above the respective diaphragms 44 and 45. The upper ends of the passages 74 communicate with a pipe 75 leading to a clutch operated valve mechanism indicated as a whole by the numeral 76 and shown in detail in Figure 5.

The valve mechanism 76 comprises a tubular housing 77 in which is arranged a valve 78 provided with a pair of heads 79 and 80 connected by a stem 81. Another head 82 forms a part of the valve 78 and is separated from the head 79 by a stem 83. This stem is drilled radially to provide a port 84 which communicates with an axial passage 85 leading through the left hand end of the valve 78, as viewed in Figure 5. The valve body 77 is provided with a pair of ports 86 and 87, the former of which communicates with the pipe 75. The port 87 communicates with a pipe 88 leading to the vacuum pipe 47, as shown in Figure 1.

The valve 78 is further provided with a pair of annular grooves 89 and 90 separated by a stem 91, and a detent 92 has its inner end adapted for engagement in the respective grooves 89 and 90, depending upon the position of the valve 78, as will be described. The detent 92 is urged inwardly by a spring 93. It will be obvious that the valve 78 is adapted to assume either of two operative positions, and that the spring pressed detent 92 resists movement of the valve away from either of such two positions. In the position of the valve 78, shown in Figure 5, the pipe 75 communicates with the atmosphere through the port 84 and passage 85. In the other position of the valve 78, the stem 83 is moved to the right of the position shown in Figure 5, in which case the ports 86 and 87 communicate with each other around the stem 81.

The right hand end of the valve 78 as viewed in Figure 5 is provided with an elongated diametrical slot 94, and the valve is provided with a relatively long axial opening 95. An operating lever 96 for the valve 78 is pivotally supported at any suitable point as at 97 and has a rounded end 98 extending through the slot 94 into the axial opening 95. A compression spring 99 is arranged between the end of the lever and the inner end of the axial opening 95. A similar spring 100 is arranged in the outer end of the bore 95, with its inner end in engagement with the end 98 of the lever, the outer end of the spring seating against a pin 101.

The other end of the lever 96 is connected in any suitable manner to some portion of the clutch to be positively actuated thereby. For example, the lower end of the lever 96 may be pivotally connected as at 102 to one end of the link 103. The opposite end of this link may be pivotally connected as at 104 with the lower end of an arm 105 carried by the conventional clutch pedal 106.

The operation of the apparatus is as follows:

Aside from the clutch operated valve shown in Figures 5 and 9, the apparatus operates in accordance with the disclosure of Patent No. 2,030,838 and the several copending applications referred to, and need not be described in detail. Assuming that the clutch is disengaged, the valve 78 (Figure 5) will occupy its operative position to the right of the position shown in Figure 5 with the detent 92 in engagement with the groove 90. Under such conditions the ports 86 and 87 will communicate with each other around the valve stem 81, and accordingly the chambers 42 above the diaphragms 44 and 45 will communicate with the intake manifold through the restricted passages 74 (Figure 6), pipe 75, ports 86 and 87 and pipes 88 and 47. Accordingly vacuum will exist in the two chambers 42 referred to, and the following brief description of the operation of the apparatus will assume that the several shifting operations takes place with the clutch disengaged and with the valve 78 in the position referred to.

Movement of the selector handle 71 to the left and rearwardly to low gear position swings the valve 64 to open the passage 62 to the atmosphere, and at the same time, the movement of the shaft 65 toward the left as viewed in Figure 4 opens the passage 66 to the atmosphere through passage 67 and ports 68 and 69 (Figures 2 and 4). Accordingly air will be admitted into the pipes 53 and 58, while the pipe 59 will remain closed to the atmosphere. The pipe 53 communicates with the diaphragm chamber 42 above the diaphragm 43, while the pipe 58 communicates with the pipe 54, leading to the diaphragm chamber 42 above the diaphragm 44. Thus air will be admitted into the upper chambers of the diaphragms 43 and 44, and since vacuum constantly exists beneath these diaphragms, the valves 25 and 26 will move into engagement with their lower seats 32. Thus the pipes 15 and 22 (Figure 7) will be opened to the vacuum passage 46 of the body of the main valve, and these pipes lead respectively to the crossover motor casing 13 and to the rear end of the cylinder 17.

The crossover motor accordingly will be actuated to tend to select the low and reverse gear shift rod for operation and assuming that the foregoing operation started with the parts in neutral position, the crossover operation will take place immediately upon movement of the selector handle 71 toward the left in the manner stated. Since the selector valve will maintain the pipe 59 closed, the pipe 55, which communicates with the pipe 59 through the valve device 56, likewise will be closed to the atmosphere. Since the pipe 55 leads to the upper chamber of the diaphragm 45, such chamber will be closed to the atmosphere and air will be exhausted therefrom through its restricted passage 74. Thus the valve 27 will remain in its upper position, and the pipe 21 (Figure 7) will be opened to the atmosphere, thus maintaining atmospheric pressure in the forward end of the cylinder 17.

Accordingly it will be apparent that the piston 18 will move rearwardly to effect movement of the first and reverse gear shift rod into low gear position. When such position is reached, the valve device 56 will open communication between the pipe 55 and the atmosphere, under which conditions the diaphragm 45 will move downwardly under the influence of atmospheric pressure in its associated chamber 42. Accordingly the valve 27 will be moved to its lower seat 32, and the forward end of the cylinder 17 will be connected to the source of vacuum through pipe 21 and vacuum passage 46. Thus the motor piston 18 will be vacuum suspended in low gear position.

The movement of the selector handle 71 to the right and forwardly into second gear position, upon the next disengagement of the clutch, opens the pipe 59 to the atmosphere. This pipe will have been previously connected to the atmosphere by the operation of the valve device 56. Thus the upper chamber of the diaphragm 45 will remain in communication with the atmosphere, and the valve 27 accordingly will remain on its seat 32. However, the selector valve 64, in second gear position, will have closed the passage 62 to the atmosphere, and accordingly the upper chamber of the diaphragm 44 will be disconnected from the atmosphere and air will be exhausted therefrom through the associated passage 74. Thus the valve 26 will move to its upper position, and the pipe 22 will connect the rear end of the cylinder 17 to the atmosphere, and the piston 18 will start to move forwardly.

The sliding movement of the shaft 65 incident to movement of the selector handle 71 to the right, as viewed in Figure 4, will close the pipe 53 to the atmosphere whereupon air will be exhausted from the upper chamber of the diaphragm 43 through the valve stem passage 49. Thus the diaphragm 43 will move upwardly to its normal position and the valve 25 will engage the seat 31 to connect the crossover motor casing 13 to the atmosphere through pipe 15. When the shifting elements reach neutral position, therefore, the biasing spring of the crossover motor will transfer the shift to the second and high gear shift rail, whereupon continued forward movement of the piston 18 will effect the shift into second gear position. When such position is reached, the valve device 56 will open the pipe 54 to the atmosphere, thus effecting downward movement of the diaphragm 44 and moving its associated valve 26 into engagement with its lower seat. Thereupon, the rear end of the cylinder 17 will be connected to the intake manifold through the vacuum passage 46, and the piston 18 will be vacuum suspended in second gear position.

The shift into high gear is made by moving the handle 71 directly rearwardly from the second gear position. This operation does not affect the crossover motor, and the second and high gear shift rail will remain selected for actuation. The rearward movement of the handle 71 controls the valves 26 and 27 and the shifting motor 16 in exactly the same manner as for low gear, and accordingly it will be apparent that the piston 18 will move rearwardly in the cylinder 17, which movement effects the shift into high gear. When such gear position is reached, the valve device 56 will vacuum suspend the piston 18 in the same manner as for low gear.

When the transmission is to be shifted into reverse gear, the main valves 26 and 27 and the shifting lever 16 will function in the same manner as for second gear. However, this shift requires movement of the selector handle 71 to the left, in which case the crossover to the first and reverse gear shift rail will take place in neutral position, whereupon the piston 18 will continue to move forwardly. When the reverse gear position is reached, the valve device 56 will again provide vacuum suspension of the piston 18 in the manner described in connection with second gear.

The foregoing operations have been described on the assumption that the clutch is disengaged prior to each shifting operation. The valve mechanism shown in Figures 5 and 9 permits preselection to be made, and the shifting operation cannot take place until after the clutch is disengaged. In accordance with the previously described operations, it will be apparent that each of the valves 26 and 27 will move to its lower position when atmospheric pressure is present above the corresponding diaphragm 44 or 45. So far as the selector valve 64 is concerned, the valves 26 and 27 are separately operable. However, when the clutch is in normal engagement the valve 78 will occupy the position shown in Figure 5, in which case the upper chambers of both diaphragms 44 and 45 will be opened to the atmosphere through ports 74, pipe 75, ports 86 and 84 and passage 85. Throughout the period of clutch disengagement, therefore, both valves 26 and 27 remain in their lower positions, thus retaining the vacuum suspension of the piston 18 in either of its gear positions. Under such conditions, it will be apparent that the selector valve 64 is ineffective for controlling pressures in the upper chambers of the diaphragms 44 and 45, and accordingly no gear shifting operation can take place so long as the vehicle clutch is in engagement.

This operation not only prevents actual shifting of the gears during clutch engagement, but also permits gear preselection to be practiced. It will be apparent that upon disengagement of the clutch, the stem 83 moves out of registration with the passage 86 (Figure 5) and this passage will be connected to the vacuum passage 87, thus connecting the upper chambers of the diaphragms 44 and 45 to the source of vacuum through the restricted passages 74. Thus the valves 26 and 27 are subject to control by the selector valve 64 and the valve device 56, as soon as the clutch is disengaged, and the shift will be made in accordance with the preselected position of the handle 71. In the apparatus as illustrated, preselection may be practiced between any two positions of the handle 71 which are respectively forward and rear positions. For example, preselection may be made between first and second gears, and second and high gears; between first and reverse gears; and between high and reverse gears. The apparatus, of course, may be provided with a preselecting valve of the type shown in Figures 6 and 7 of Patent No. 2,030,838, in which case preselection may be practiced between any two gear positions.

The functions described for the clutch operated valve in Figures 5 and 9 correspond generally to the functions of the valve illustrated in Figure 12 of copending application Serial No. 43,104, referred to above. In such construction, the clutch operated valve is positively connected to the clutch pedal for movement therewith, in which case the ports of the valve housing are progressively opened and closed and might be inclined to result in a somewhat sluggish operation. In the present construction, it will be noted that the valve 78 is not positively connected to the clutch for operation thereby, movement being transmitted to this valve solely through the springs 99 and 100. Moreover, it will be noted that the detent 92 forms means for offering substantial resistance to the movement of the valve 78.

Accordingly, it will be apparent that the clutch pedal 106 and lever 96 are adapted to partake of substantial movement before effecting movement of the valve 78. For example, when the vehicle clutch is in engagement, the lever 96 will occupy the position shown in Figure 5. When clutch disengaging movement is transmitted to the pedal 106, the lever 96 will turn in a clockwise direction as viewed in Figure 5, and the upper end of this lever will progressively build up tension in the spring 100. The parts are designed, including the degree of tension of the springs 99 and 100, so that after complete disengagement of the clutch elements, the tension built up in the spring 100 will be sufficient to overcome the resistance of the detent 92 against sliding movement of the valve 78, and at such point the valve 78 will snap to the right of the position shown in Figure 5, and the detent will move across the stem 91 and engage the groove 90. As previously stated, this operation restores the controlling of the valves 26 and 27 to the selector valve 64 and the valve device 56.

Upon subsequent engagement of the clutch, the lever 96 will turn in a counter-clockwise direction, and the upper end of the lever will build up the tension of the spring 99. When the engagement of the clutch elements has been completed, the tension of the spring 99 will be built up to the point necessary to overcome the resistance of the detent 92 to movement of the valve 78, whereupon this valve snaps to the left to return to the position shown in Figure 5, thus rendering the selector valve ineffective for controlling the operation of the main valves 26 and 27.

Thus it will be apparent that the clutch operated valve 76 is important in improving the general efficiency of the shifting apparatus, the valve 78 moving very rapidly between its two positions and preventing the possibility of any resulting sluggishness in the operation of the apparatus. Moreover, the clutch operated valve ports readily may be so designed as to permit an extremely rapid connection of the pipe 75 to the atmosphere or the disconnection of such pipe therefrom at the proper times with respect to the position of the clutch elements.

Generally speaking the spring means which transmit movement to the valve 78 constitutes a lost motion connection between the clutch and the valve 78, thus permitting the clutch to move throughout its range of clutch engaging and disengaging movement without transmitting movement to the valve 78. Such lost motion means, therefore, prevents the main valve mechanism from being rendered operative or inoperative too soon with relation to the movement of the clutch elements. The spring means for providing the lost motion between the clutch and the valve 78 is preferred for the reason that during the range of movement of the clutch pedal in which no movement is imparted to the valve 78, the spring tension is being built up so that the valve 78 snaps very rapidly back and forth between its two positions.

Where the term "clutch" occurs in the claims it is to be understood that this expression is not limited to the clutch elements per se, but is intended to designate the conventional clutch unit as a whole including the operating elements usually associated therewith.

Where the claims define the main control valve mechanism as being rendered "inoperative" by the means (valve mechanism 76) operable upon actuation of the clutch, it is to be understood that the expression "inoperative" is intended to mean that the main valves 26 and 27 are incapable of being controlled or moved as distinguished from being rendered merely ineffective for controlling the shifting motor, which would be true if a valve mechanism similar to the mechanism 76 should be arranged in the pipe 47 to disconnect the shifting motor from the source of vacuum.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A gear shifting mechanism for a motor vehicle having a clutch and a transmission, comprising a power operated gear shifting mechanism, control mechanism for said shifting mechanism, and means operable upon actuation of the clutch for rendering said control mechanism inoperative when the clutch is engaged and operative when the clutch is disengaged, said means having lost motion connection with the clutch.

2. A gear shifting mechanism for a motor vehicle having a clutch and a transmission, comprising a power operated gear shifting mechanism, control mechanism for said shifting mechanism, and means operable upon actuation of the clutch for rendering said control mechanism inoperative when the clutch is engaged and operative when the clutch is disengaged, said means including a resilient motion transmitting device connecting it to the clutch.

3. A gear shifting mechanism for a motor vehicle having a clutch and a transmission, comprising a power operated gear shifting mechanism, a plurality of control devices for controlling said mechanism, and means operable upon actuation of the clutch for controlling said devices, said means including a resilient motion transmitting device connecting it to the clutch.

4. A gear shifting mechanism for a motor vehicle having a clutch and a transmission, comprising a differential pressure operated gear shifting mechanism, a plurality of control devices for said mechanism, fluid pressure operated means for effecting actuation of said control devices, and means operable upon actuation of the clutch for rendering said pressure operated means inoperative when the clutch is in engagement, said last named means having lost motion connection with the clutch.

5. A gear shifting mechanism for a motor vehicle having a clutch and a transmission, comprising a differential pressure operated gear shifting mechanism, a plurality of control devices for said mechanism, fluid pressure operated means for effecting actuation of said control devices, and means operable upon actuation of the clutch for rendering said pressure operated means inoperative when the clutch is in engagement, said last named means including a resilient motion transmitting device connecting it to the clutch.

6. A gear shifting mechanism for a motor vehicle having a clutch and a transmission, comprising a power operated gear shifting mechanism, a plurality of control devices for said mechanism, means for actuating said control devices, and means operable upon actuation of the clutch for controlling said control devices, said last named means comprising a movable element, means resisting the movement of said element, and a lost motion connection for transmitting movement from the clutch to said element.

7. A gear shifting mechanism for a motor vehicle having a clutch and a transmission, comprising a power operated gear shifting mechanism, a plurality of control devices for said mechanism, means for actuating said control devices, and means operable upon actuation of the clutch for controlling said control devices, said last named means comprising a movable element, means resisting the movement of said element, and a resilient motion transmitting device for transmitting movement from the clutch to said element.

8. A gear shifting mechanism for a motor vehicle having a clutch and a transmission, comprising a differential pressure operated gear shifting mechanism, a plurality of control valves for controlling said mechanism, and means connected for controlling said control valves, said last named means comprising an auxiliary valve, means resisting movement of said valve, and a lost motion connection for transmitting movement to said auxiliary valve upon actuation of the clutch.

9. A gear shifting mechanism for a motor vehicle having a clutch and a transmission, comprising a differential pressure operated gear shifting mechanism, a plurality of control valves for controlling said mechanism, and means connected for controlling said control valves, said last named means comprising an auxiliary valve, means resisting movement of said valve, and resilient means for transmitting movement to said auxiliary valve upon actuation of the cutch.

10. A gear shifting mechanism for a motor vehicle having a clutch and a transmission, comprising a differential pressure operated gear shifting mechanism, a plurality of control valves for said mechanism, selectively operable differential pressure operated means for actuating said control valves, means including a movable element connected for controlling the establishment of differential pressure in said last named means, and a lost motion connection for transmitting movement to said element upon actuation of the clutch.

11. A gear shifting mechanism for a motor vehicle having a clutch and a transmission, comprising a differential pressure operated gear shifting mechanism, a plurality of control valves for said mechanism, selectively operable differential pressure operated means for actuating said control valves, means including a movable element connected for controlling the establishment of differential pressure in said last named means, and resilient means for transmitting movement to said element upon actuation of the clutch.

12. A gear shifting mechanism for a motor vehicle having a clutch and a transmission, comprising a power operated gear shifting mechanism, a plurality of control devices for said mechanism, differential pressure operated means for effecting actuation of said control devices, manual selecting means for controlling the differential pressures affecting said pressure operated means, means connected for rendering said manual selecting means ineffective for controlling differential pressures in said pressure operated means, and lost motion means connecting said last named means for movement upon actuation of the clutch.

13. A gear shifting mechanism for a motor vehicle having a clutch and a transmission, comprising a power operated gear shifting mechanism, a plurality of control devices for said mechanism, differential pressure operated means for effecting actuation of said control devices, manual selecting means for controlling the differential pressures affecting said pressure operated means, means connected for rendering said manual selecting means ineffective for controlling differential pressures in said pressure operated means, and resilient means for transmitting movement to said last named means upon actuation of the clutch.

14. A gear shifting mechanism for a motor vehicle having a clutch and a transmission, comprising a power operated gear shifting mechanism, a plurality of control devices for said mechanism, differential pressure operated means for effecting actuation of said control devices, manual selecting means for controlling the differential pressures affecting said pressure operated means, means including a movable element connected for rendering said manual selecting means ineffective for controlling the differential pressures affecting said pressure operated means, means for resisting movement of said movable element, and lost motion means connecting said movable element for movement upon actuation of the clutch.

15. A gear shifting mechanism for a motor vehicle having a clutch and a transmission, comprising a power operated gear shifting mechanism, a plurality of control devices for said mechanism, differential pressure operated means for effecting actuation of said control devices, manual selecting means for controlling the differential pressures affecting said pressure operated means, means including a movable element connected for rendering said manual selecting means ineffective for controlling the differential pressures affecting said pressure operated means, means for resisting movement of said movable element, and resilient means for transmitting movement to said movable element upon actuation of the clutch.

16. A gear shifting mechanism for a motor vehicle having a clutch and a transmission, comprising a power operated gear shifting mechanism, a plurality of control devices for said mechanism, fluid pressure operated means for selectively actuating said control devices, a source of non-atmospheric pressure, a conduit normally connecting said pressure operated means to said source, manual means for selectively connecting said pressure operated means to the atmosphere, a valve operable for connecting said conduit to the atmosphere independently of said manual means, means resisting movement of said valve, and lost motion operating means connected to move said valve upon actuation of the clutch.

17. A gear shifting mechanism for a motor vehicle having a clutch and a transmission, comprising a power operated gear shifting mechanism, a plurality of control devices for said mechanism, fluid pressure operated means for selectively actuating said control devices, a source of non-atmospheric pressure, a conduit normally connecting said pressure operated means to said source, manual means for selectively connecting said pressure operated means to the atmosphere, a valve operable for connecting said conduit to the atmosphere independently of said manual means, means resisting movement of said valve, and resilient motion transmitting means connected to move said valve upon actuation of the clutch.

18. A gear shifting mechanism for a motor vehicle having a clutch and a transmission, comprising a power operated gear shifting mechanism, a plurality of control devices for said mechanism, fluid pressure operated means for selectively actuating said control devices, a source of non-atmospheric pressure, a conduit normally connecting said pressure operated means to said source, manual means for selectively connecting said pressure operated means to the atmosphere, a valve operable for connecting said conduit to the atmosphere independently of said manual means, said valve being provided with a pair of spaced grooves, a spring pressed detent selectively engageable in said grooves to resist movement of said valve, and lost motion operating means connected to move said valve upon actuation of the clutch.

19. A gear shifting mechanism for a motor vehicle having a clutch and a transmission, comprising a power operated gear shifting mechanism, a plurality of control devices for said mechanism, fluid pressure operated means for selectively actuating said control devices, a source of non-atmospheric pressure, a conduit normally connecting said pressure operated means to said source, manual means for selectively connecting said pressure operated means to the atmosphere, a valve operable for connecting said conduit to the atmosphere independently of said manual means, said valve being provided with a pair of spaced grooves, a spring pressed detent selectively engageable in said grooves to resist movement of said valve, a lever having one end thereof adapted to be operated upon actuation of the clutch, and a pair of springs carried by said valve, the other end of said lever being arranged between said springs and operable therethrough for transmitting movement to said valve.

20. A gear shifting mechanism for a motor vehicle having a clutch and a transmission, comprising a power operated gear shifting mechanism, control mechanism for said shifting mechanism, means movable between two positions for rendering said control mechanism respectively operative and inoperative, and snap acting means operable upon movement of the clutch between its engaged and disengaged positions for moving said first named means respectively into its two positions.

SULO MICHAEL NAMPA.